United States Patent [19]

Koster et al.

[11] Patent Number: 4,971,152

[45] Date of Patent: Nov. 20, 1990

[54] METHOD AND APPARATUS FOR REPAIRING WELL CASINGS AND THE LIKE

[75] Inventors: Charles H. Koster, Alvin; Clark Clement, Katy; A. C. Hill, Navasota, all of Tex.; James M. Baker, Weatherford, Okla.

[73] Assignee: Nu-Bore Systems, Alvin, Tex.

[21] Appl. No.: 391,967

[22] Filed: Aug. 10, 1989

[51] Int. Cl.[5] .................... B32B 31/20; E21B 29/10; E21B 33/124; E21B 33/127

[52] U.S. Cl. .................................. 166/277; 138/144; 156/287; 156/425; 166/187; 166/191

[58] Field of Search ............... 166/277, 380, 387, 187, 166/191, 242, 63; 138/144, 150, 154; 156/286, 285, 294, 425; 493/300

[56] References Cited

U.S. PATENT DOCUMENTS

| | | | |
|---|---|---|---|
| 3,028,915 | 4/1962 | Jennings | 166/277 |
| 3,080,269 | 3/1963 | Pollock et al. | 156/286 X |
| 3,111,991 | 11/1963 | O'Neal | 166/277 X |
| 3,167,122 | 1/1965 | Lang | 166/277 |
| 3,179,168 | 4/1965 | Vincent | 166/277 |
| 3,209,835 | 10/1965 | Bourne, Jr. et al. | 166/191 X |
| 3,364,993 | 1/1968 | Skipper | 166/207 X |
| 3,369,426 | 2/1968 | Matz, Jr. | 156/294 X |

Primary Examiner—Stephen J. Novosad
Attorney, Agent, or Firm—Hopgood, Calimafde, Kalil, Blaustein & Judlowe

[57] ABSTRACT

The process involves creating an internal lining in a bore, e.g., for repairing well casings. A plurality of layers of resilient strip material having an adhesive material, in uncured condition and interspersed between overlapping surfaces of the strip material and between the outer surface thereof and the bore, are applied in spiral fashion by means of a mandrel to the portion of the bore to be lined. Pressure is then applied to the internal surface of the liner to force the liner against the inner surface of the bore, preferably by inflation of a packer or packer assembly whose length is substantially the length of the liner, until the adhesive is cured. The mandrel for creating the liner in a bore includes a portion adapted to receive the spirally-wrapped strip material, a packer at the upper end of the wrappable portion of the mandrel and a packer terminating at the lower end of the wrappable portion of the mandrel and extending therebelow.

8 Claims, 1 Drawing Sheet

METHOD AND APPARATUS FOR REPAIRING WELL CASINGS AND THE LIKE

In co-pending U.S. Pat. applications Ser. No. 223,557 filed July 15, 1988, now U.S. Pat. No. 4,865,127, and Ser. No. 295,290 filed Jan. 10, 1989, now U.S. Pat. No. 4,913,758, method and apparatus have been disclosed for lining portions of bores such as well casing or the like. The method involves wrapping plural layers of strip material interspersed with a curable adhesive about a mandrel, inserting the mandrel into a bore to be lined such that the wrapped strip is presented to the wall of the casing to be lined. The spirally-wrapped strip material is then unwrapped from the mandrel against the casing wall and the adhesive is cured to create a liner across the affected portion of the bore wall. The application Ser. No. 223,557, now U.S. Pat. No. 4,865,127, discloses apparatus wherein the mandrel is turned from the surface to unwrap the strip from the mandrel against the bore wall to be lined, and application Ser. No. 295,290, now U.S. Pat. No. 4,913,758, discloses a mandrel which is powered by gravity for rotation and unwinding of the wound strip. In each embodiment, packers are provided at each end of the mandrel. The lower packer serves to anchor the mandrel in position in the well and releases the bottom end of the wrapped strip from the mandrel. Inflation of the top packer releases the top portion of the spirally-wrapped liner from the mandrel. Each of the aforementioned prior applications is incorporated herein by reference.

Experience has shown that the bonding of adhesives to materials such as steel, BeCu and other metallic and non-metallic materials can be greatly improved by increasing the applied pressure upon the joined surfaces. Application of pressure also tends to displace unwanted lighter liquids which have been trapped between layers and reduces the overall thickness of the bonded layer(s) by forcing a more uniform layer of the viscous adhesive. Bubbles, overlaps and other types of anomalies that may occur during the fabrication process are reduced or eliminated by the application of pressure.

SUMMARY OF THE INVENTION

In accordance with the invention, a liner is created within a bore. This liner may be a layer or layers of material applied to the internal surface of the bore. Pressure is then applied to the internal surface of the liner preferably by the inflation of a packer or packer assembly whose length is substantially the length of the liner and which is maintained in place until the adhesive, which is usually a liquid, is cured. It is found that the integrity of the liner is improved as compared to the case in which no such pressure is employed. In addition, bonding of the lining to the bore wall is improved since pressure improves spreading of the adhesive applied therebetween.

DETAILED DESCRIPTION OF THE INVENTION

Figures 1, 2, 3, 4, 5:
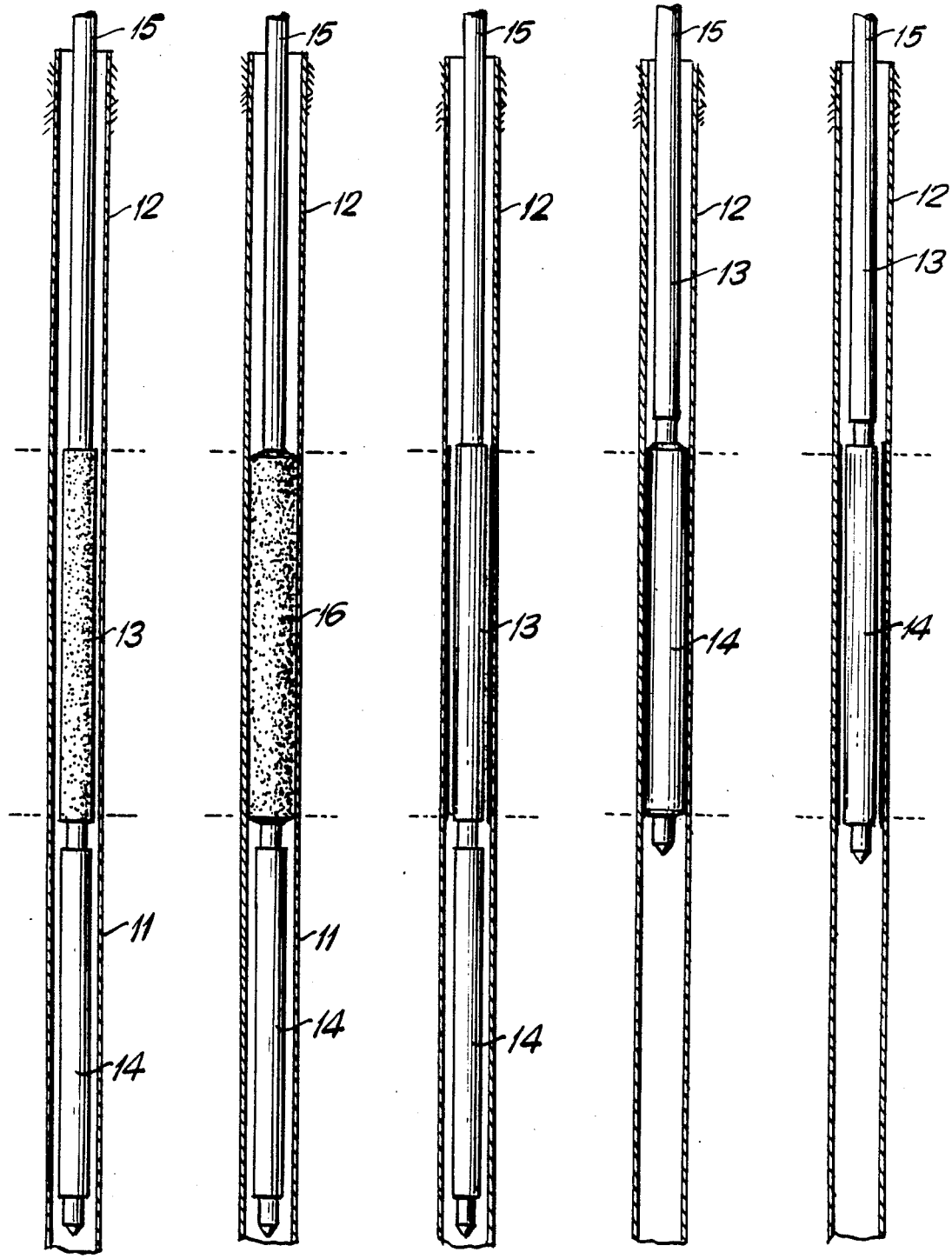
FIG. 1 depicts a mandrel in accordance with the invention in place in a downhole well casing at an area of the lined.
FIG. 2 depicts the mandrel after patch material initially wrapped thereon has been unwrapped to cover the affected portion of the casing.
FIG. 3 depicts the mandrel with all packers deflated after completion of the patch.
FIG. 4 depicts the mandrel in position with the lower packer assembly across the patch while the adhesive cures.
FIG. 5 depicts the tool with all packers deflated in position to be retrieved.

The invention will now be described in conjunction with the drawing which shows in FIG. 1 the complete tool assembly in place in a well casing 12. The tool assembly 11 comprises a mandrel 13 carrying spirally-wrapped strip to form a liner at a portion of the casing wall, a lower packer 14, usually having the same length as the mandrel 13, and an upper packer which for clarity is not shown. The assembly is suspended from well bore string 15 which is controlled from the surface. In FIG. 2, the lower packer 14 is shown deflated and strip 16, which was spirally-wrapped on mandrel 13, as shown in FIG. 1, has been transferred to the inner wall of casing 12 to form a liner thereon. In FIG. 3, the tool assembly is shown with packers deflated so that the assembly may be moved in the casing. In FIG. 4, the lower packer 14 has been moved within the liner and covers substantially the entire length thereof in the inflated condition. Packer 14 is maintained inflated within the liner until the adhesive placed between facing layers of strip material to form the liner has been cured. Curing can be accomplished by passing heated water through packer 14 when the curable adhesive is a resin settable by heat. Once curing of the resin has been effected while packer 14 is in contact with the inner face of the liner, the liner is complete and the tool string can be removed from the bore. In FIG. 5, the tool is shown with packers deflated. It can then be removed readily from the casing, leaving the completed liner in place.

While it is difficult to ascertain all the events transpiring within the downhole casing during the lining operation, it is found that curing of the resin applied between adjacent, facing layers of the spirally-wound strip forming the liner while the layers are being squeezed together and held in fixed relation by internal pressure supplied by, e.g., the packer inserted substantially along the length of the liner, improves the integrity of the liner. Furthermore, the pressure applied to the patch by the packer not only improves the adhesive bond between adjacent facing layers of the spirally-wound strip but also improves bonding between the patch material strip and the casing wall. Leak routes between the patch and the casing wall are effectively eliminated. It is to be appreciated that a layer of adhesive is applied to the outer surface of the liner material as it is wrapped so that adhesive, e.g., epoxy, is present between the patch and the casing wall.

It is to be appreciated that the invention is not only applicable to linings formed from layers of specially-wrapped strip with adhesive between strip layers and between the lining and the bore wall to be lined, but also to linings made of tubular material, e.g., a cylinder having longitudinal flutings or corrugations thereon which can be expanded against a bore wall. The integrity of the adhesive bond between such linings and the mating bore wall is improved and spreading of liquid adhesive between lining and bore wall is improved by application of internal pressure as contemplated by the invention.

What is claimed is:

1. The process for producing an internal liner in a portion of a bore which comprises applying to said bore a plurality of layers of resilient strip material having adhesive material interspersed between overlapping surfaces of said strip material to form adhesive layers between said strip material layers and between said strip material and said bore, said strip material being applied in spiral fashion to said portion, and then applying internal pressure to said liner to press said liner firmly against said bore until said adhesive is cured.

2. The process in accordance with claim 1 wherein said bore is a well casing.

3. A mandrel for making a liner in a bore comprising a portion adapted to receive a wrapping of spirally-wrapped strip material to be transferred to the casing wall, a packer at the upper end of said wrappable portion, and a packer terminating at the lower end of said wrappable portion and extending therebelow, said lower end substantially the length of said wrappable portion.

4. In the process for inserting a liner inside a portion of a bore in which strip material is spirally-wound about a mandrel provided with packers at the upper and lower ends thereof, with adhesive material interspersed between the overlapping surfaces of said spirally-wrapped strip and on the outer surface of said strip, the mandrel with strip material wrapped thereon is lowered into a well to be repaired, a lower packer is inflated to anchor the mandrel in position in the well with said wrapped strip located at a portion of the casing wall to be repaired, the wrapped strip is unwound from said mandrel along with said adhesive layers between wrapped faces of said strip, and the upper packer is then inflated to release the strip from the mandrel, and both packers are then deflated to release the mandrel from contact with the casing wall, the improvement for further increasing the integrity of the liner in the bore which comprises applying said liner to a bore wall with said adhesive in the uncured condition, making said lower packer of substantially the same length as the liner to be made, raising the mandrel within the well to register the lower packer opposite the liner, inflating said lower packer and maintaining the face of said lower packer in contact with said liner until curing of the adhesive is substantially complete.

5. The process in accordance with claim 4 wherein said packer is provided with a release compound to prevent adhesion of said adhesive thereto.

6. A process for creating a lining in a bore which comprises forming within said bore a substantially cylindrical liner comprising a plurality of layers of resilient spirally-wrapped strip material having adhesive applied between facing layers of said strip, said liner having a layer of adhesive between the outer surface thereof and the inner matching surface of said bore and then applying pressure to the inner surface of said liner to force said liner against the inner surface of said bore for the time required to affect curing of said adhesive.

7. A process in accordance with claim 6 wherein said strip material is beryllium copper and said adhesive is a liquid epoxy.

8. A process in accordance with claim 7 wherein said lining is applied to a defective portion of a well casing.

* * * * *